May 28, 1940.  W. E. WORTHAM  2,202,242

HOLDER FOR EYEGLASSES

Filed June 8, 1938

INVENTOR:
William Enders Wortham.
BY
ATTORNEY.

Patented May 28, 1940

2,202,242

UNITED STATES PATENT OFFICE 2,202,242

HOLDER FOR EYEGLASSES

William Enders Wortham, St. Louis, Mo.

Application June 8, 1938, Serial No. 212,544

2 Claims. (Cl. 248—300)

This invention relates to holders for eyeglasses, or spectacles.

One feature of the invention is the provision of a convenient and safe place to deposit spectacles, or eyeglasses instead of just laying them down anywhere in an automobile, the home, office, work shop, or other place.

Another feature of the invention is the provision of a holder for eyeglasses and establishing therefore a definite place to keep same when not in use, and, which will provide security against the lenses becoming scratched, or broken while not in use.

Another feature of the invention is the provision of a holder for spectacles including a supporting member having a pair of retentive conformations for the reception and supporting of the lens portions of spectacles in such fashion that the spectacles will be held against accidental displacement in the holder, yet easily removed therefrom by merely lifting the same.

With these and other features and objects in view, as will appear more clearly in the course of the following specification and claims, an illustrative form of practicing the invention is set out in the accompanying drawing wherein the novel features of construction, arrangement and combination of parts are shown.

Referring to the drawing.

Figure 1:
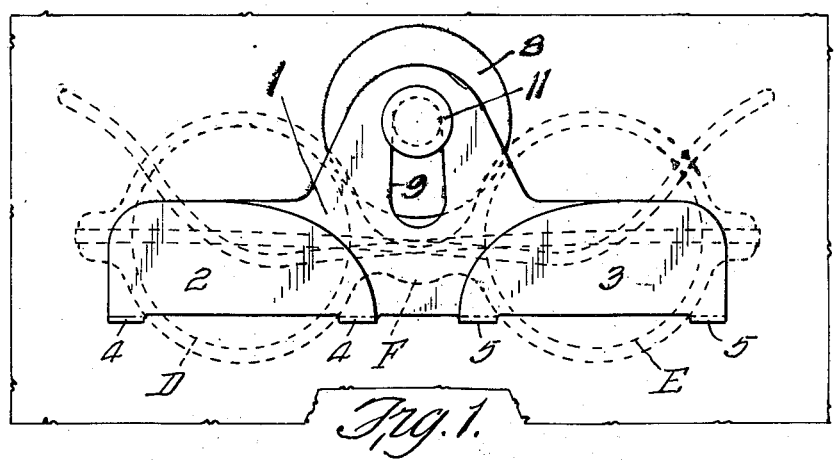
Fig. 1 is a front elevation of a holder embodying the features of my invention and showing a pair of eyeglasses, in dotted lines, supported thereby.
Figure 2:
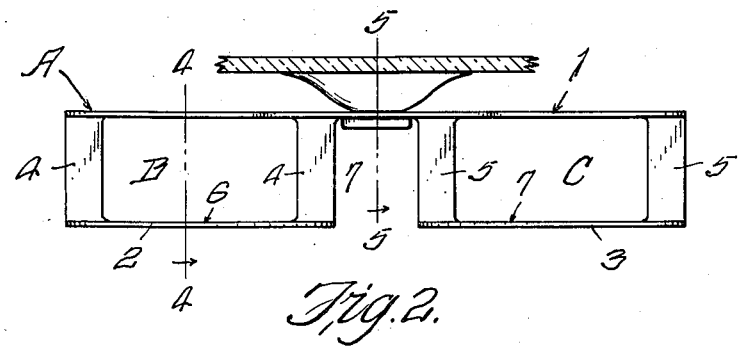
Fig. 2 is top plan view of the holder.
Figures 3, 4, 5:
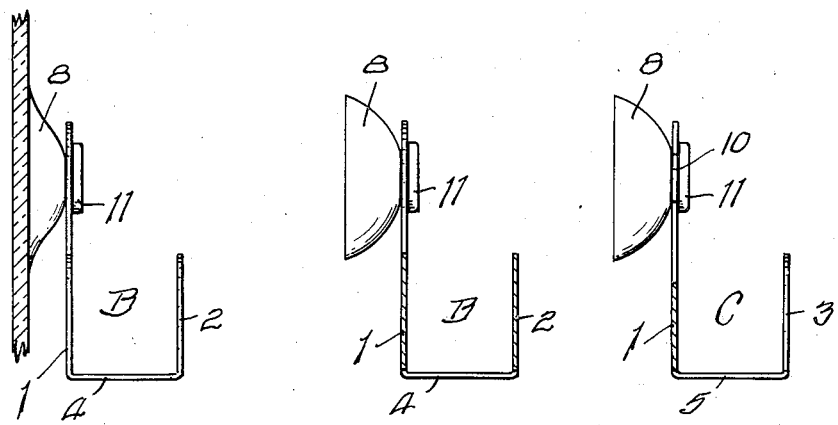
Fig. 3 is an end elevation of the holder.
Fig. 4 is a sectional view of the holder taken on line 4—4 of Fig. 2.
Fig. 5 is a sectional view of the holder taken on line 5—5 of Fig. 2.

In carrying out the invention, I refer now more particularly to the drawing, in which the reference character A designates, generally, the holder as designed to support a pair of eyeglasses, or spectacles, when not in use.

The holder A, in one embodiment thereof, includes a suitable supporting base, or member 1, a pair of suitable guard members designated 2 and 3 spaced in advance of the supporting member 1, a pair of spaced members 4 connecting the guard member 2 with the supporting member 1, and a pair of spaced members 5 connecting the guard member 3 with the supporting member 1.

The parts are so designed and arranged as to form a pair of retentive conformations B and C for receiving the lens portions of spectacles, or eyeglasses.

In dotted lines, as shown in Fig. 1, a pair of eyeglasses are supported by the holder A, and the lens portions thereof are designated D and E, while the nose piece connecting the same is designated F.

The holder may be made from any suitable material, and it may be rubber coated, if so desired, dependent, of course, upon what kind of material the holder is made from.

In end elevation, the structure is substantially U-shaped in formation. The connecting pieces 4 and 5 are spaced apart to provide elongated lens receiving openings 6 and 7, respectively therebetween. The two innermost connecting pieces 4 and 5 are spaced apart to provide a finger gap 7, which gap is spanned by the nose piece of a pair of eyeglasses when supported by the holder. The gap 7 permits the user of the eyeglasses to grasp the nose piece of the eyeglasses when placing the eyeglasses in the holder, or removing the same therefrom. The eyeglasses or spectacles are preferably supported in an inverted position, as illustrated, and, it will be observed that a portion of the lens portions of the eyeglasses pass through the openings 6 and 7 so that the lenses will be actually supported by the connecting pieces 4 and 5 due to their spaced relation, as clearly shown.

The holder is supported upon any smooth vertical surface, such, for instance, as the windshield of an automobile, mirror in a bathroom, or other similar place, by means of a suitable vacuum cup 8 which is preferably, although not necessarily detachably connected with the supporting, or base member 1.

When the vacuum cup is detachably connected to the member 1, the same is suitably slotted, as at 9, and the vacuum cup is provided with a neck 10 and a head 11. The head 11 is adapted to pass through the opening 9, which opening is wider at its lower end than at its upper end, for easy passage of the head therethrough, and then the suction device is moved to the upper end of the slotted opening 9.

From the foregoing description, it will be readily apparent that the holder provides a safe place for spectacles, or eyeglasses, when not in use. For instance, in an automobile, a safe place is provided for sun glasses; in the bathroom a safe place is provided for eyeglasses when bathing the face, and likewise in any part of the home, office, or work shop when eyeglasses are not worn.

The many advantages of the herein described invention will readily suggest themselves to persons wearing eyeglasses.

From the foregoing description, it is evident that a simple device for this purpose has been disclosed, but it is to be understood that I have illustrated and described a preferred embodiment only of the invention and do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. An eyeglass holder including a sheet metal back plate having an upwardly projecting portion midway its ends and having a vertically disposed slotted opening adapted to receive a fastening device, a pair of sheet metal lens guard plates spaced from the back plate and from each other end to end, a pair of spaced lens rest arms connecting each lens guard plate with the back plate and providing an opening therebetween through which the lower portions of the eyeglass lens can project downwardly to prevent longitudinal displacement of a pair of eyeglasses supported by the holder.

2. An eyeglass holder including a back plate, a pair of lens guard plates spaced from the back plate and from each other, and a pair of lens rests connecting each lens guard plate with the back plate to provide openings through which the lower portions of the lens project to prevent longitudinal displacement of a pair of eyeglasses when held by the holder.

WILLIAM ENDERS WORTHAM.